United States Patent
Chang et al.

(10) Patent No.: US 10,558,052 B2
(45) Date of Patent: Feb. 11, 2020

(54) ADJUSTING MECHANISM AND HEAD MOUNTED DISPLAY

(71) Applicant: HTC Corporation, Taoyuan (TW)

(72) Inventors: Chun-Wei Chang, Taoyuan (TW); Ying-Chieh Huang, Taoyuan (TW); Yen-Cheng Lin, Taoyuan (TW); Yu-Yu Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 193 days.

(21) Appl. No.: 15/933,395

(22) Filed: Mar. 23, 2018

(65) Prior Publication Data
US 2019/0293945 A1    Sep. 26, 2019

(51) Int. Cl.
  *G02B 27/01*  (2006.01)
  *A42B 3/14*   (2006.01)
  *A42B 3/32*   (2006.01)

(52) U.S. Cl.
  CPC .......... *G02B 27/0176* (2013.01); *A42B 3/145* (2013.01); *A42B 3/324* (2013.01); *G02B 2027/0156* (2013.01); *Y10T 24/2187* (2015.01)

(58) Field of Classification Search
  CPC ........ G02B 27/0176; G02B 2027/0156; G02B 7/002; Y10T 24/2104; Y10T 24/2113;
  (Continued)

(56) References Cited

U.S. PATENT DOCUMENTS

| 3,444,560 | A | * | 5/1969 | Northup, Jr. | ........... A42B 3/145 2/8.1 |
| 7,174,575 | B1 | * | 2/2007 | Scherer | .................. A42B 3/145 2/418 |

(Continued)

FOREIGN PATENT DOCUMENTS

| CN | 205750111 | 11/2016 |
| TW | M373967 | 2/2010 |
| TW | M461310 | 9/2013 |

OTHER PUBLICATIONS

"Office Action of Taiwan Counterpart Application," dated Sep. 26, 2018, pp. 1-3.

*Primary Examiner* — Robert Sandy
*Assistant Examiner* — Rowland Do
(74) *Attorney, Agent, or Firm* — JCIPRNET

(57) ABSTRACT

An adjusting mechanism and a head mounted display are provided. The adjusting mechanism includes a band, a rotating shaft, a knob, a driving member, and a holder. The rotating shaft has a first ring tooth around a central axis. The band is driven by the rotating shaft to move relative to the rotating shaft when the rotating shaft rotates around the central axis. The knob has a plurality of chutes. Each chute has a first section and a second section. The depth of each first section is deeper than the depth of each second section. The driving member has a second ring tooth, a plurality of guiding pins, and a plurality of pawls. The driving member is assembled to the knob, and the guiding pins are located in the chutes. The holder has a circular unidirectional tooth. The band limits the rotation of the holder relative to the band. The circular unidirectional tooth is configured to be coupled with these pawls to limit the rotation of the driving member relative to the holder in a single direction.

12 Claims, 10 Drawing Sheets

(58) Field of Classification Search
CPC ... Y10T 24/2128; Y10T 24/2187; A42B 1/24; A42B 3/145; A42B 3/324; A42B 1/22; A43C 11/165
USPC .................................................. 2/417, 418
See application file for complete search history.

(56) References Cited

U.S. PATENT DOCUMENTS

| | | | | |
|---|---|---|---|---|
| 7,854,024 | B2* | 12/2010 | Fang | A42B 3/145 |
| | | | | 2/417 |
| 8,015,625 | B2* | 9/2011 | Grim | A42B 3/145 |
| | | | | 2/418 |
| 8,245,371 | B2* | 8/2012 | Chen | A43C 7/00 |
| | | | | 24/68 B |
| 8,434,200 | B2* | 5/2013 | Chen | A43C 11/165 |
| | | | | 2/418 |
| 9,408,437 | B2 | 8/2016 | Goodman et al. | |
| 9,706,814 | B2* | 7/2017 | Converse | A61F 5/0123 |
| 2010/0095438 | A1* | 4/2010 | Moelker | A42B 3/145 |
| | | | | 2/418 |
| 2015/0059065 | A1* | 3/2015 | Klotz | A42B 3/145 |
| | | | | 2/418 |
| 2015/0107006 | A1* | 4/2015 | Chen | A42B 3/324 |
| | | | | 2/418 |
| 2015/0313319 | A1* | 11/2015 | Ha | A43C 11/165 |
| | | | | 24/303 |
| 2019/0150569 | A1* | 5/2019 | Chen | A43C 11/165 |

* cited by examiner

ADJUSTING MECHANISM AND HEAD MOUNTED DISPLAY

BACKGROUND OF THE INVENTION

1. Field of the Invention

The disclosure relates to an adjusting mechanism and a head mounted display.

2. Description of Related Art

With advances in technology, the application of virtual reality is becoming pervasive. How to fix a head mounted display to a user's head by a simple and convenient method and how to adjust the head mounted display easily become a significant issue.

However, the fixing mechanism of some head mounted displays on the market is excessively complicated and is not user-friendly.

SUMMARY OF THE INVENTION

The disclosure provides an adjusting mechanism and a head mounted display for a user to make and adjustments quickly and intuitively.

The adjusting mechanism according to an embodiment of the disclosure includes a band, a rotating shaft, a knob, a driving member, and a holder. The rotating shaft has a first tooth ring around a central axis. The band is driven by the rotating shaft to move relative to the rotating shaft when the rotating shaft rotates around the central axis. The knob has a plurality of chutes. Each of the chutes has a first section and a second section. The depth of each of the first sections is larger than the depth of each of the second sections. The driving member has a second tooth ring, a plurality of guiding pins, and a plurality of pawls. The driving member is assembled to the knob, and the guiding pins are located in the chutes. The second tooth ring engages with the first tooth ring when the guiding pins are located in the first sections; the second tooth ring is detached from the first tooth ring when the guiding pins are located in the second sections. The holder has a circular unidirectional toothed portion. The band limits the rotation of the holder relative to the band. The circular unidirectional toothed portion is configured to be coupled with the pawls to limit the rotation of the driving member relative to the holder in a single direction.

The head mounted display according to an embodiment of the disclosure includes a display portion and an adjusting mechanism. The adjusting mechanism includes a band, a rotating shaft, a knob, a driving member and a holder. The display portion is connected to the band. The rotating shaft has a first tooth ring around a central axis. The band is driven by the rotating shaft to move relative to the rotating shaft when the rotating shaft rotates around the central axis. The knob has a plurality of chutes. Each of the chutes has a first section and a second section. The depth of each of the first sections is larger than the depth of each of the second sections. The driving member has a second tooth ring, a plurality of guiding pins, and a plurality of pawls. The driving member is assembled to the knob, and the guiding pins are located in the chutes. The second tooth ring engages with the first tooth ring when the guiding pins are located in the first sections; the second tooth ring is detached from the first tooth ring when the guiding pins are located in the second sections. The holder has a circular unidirectional toothed portion. The band limits the rotation of the holder relative to the band. The circular unidirectional toothed portion is configured to be coupled with the pawls to limit the rotation of the driving member relative to the holder in a single direction.

In view of the above, for the head mounted display and the adjusting mechanism according to the disclosure, the driving member allows the rotating shaft to rotate around the central axis to drive the band to move relative to the rotating shaft, so the user may adjust the tightness of the band. The user may adjust the tightness of the adjusting mechanism according to the disclosure in a similar way that the user uses daily necessities. In addition, after the driving member is detached from the rotating shaft, the band may be loosened quickly to enable the user to let the band be in a relaxed state easily and intuitively.

In order to make the aforementioned and other features and advantages of the invention comprehensible, several exemplary embodiments accompanied with figures are described in detail below.

BRIEF DESCRIPTION OF THE DRAWINGS

FIG. 3b is a cross-sectional view of the adjusting mechanism of FIG. 3a.

FIG. 4b is a cross-sectional view of the adjusting mechanism of FIG. 4a.

DESCRIPTION OF THE EMBODIMENTS

Figure 1A:
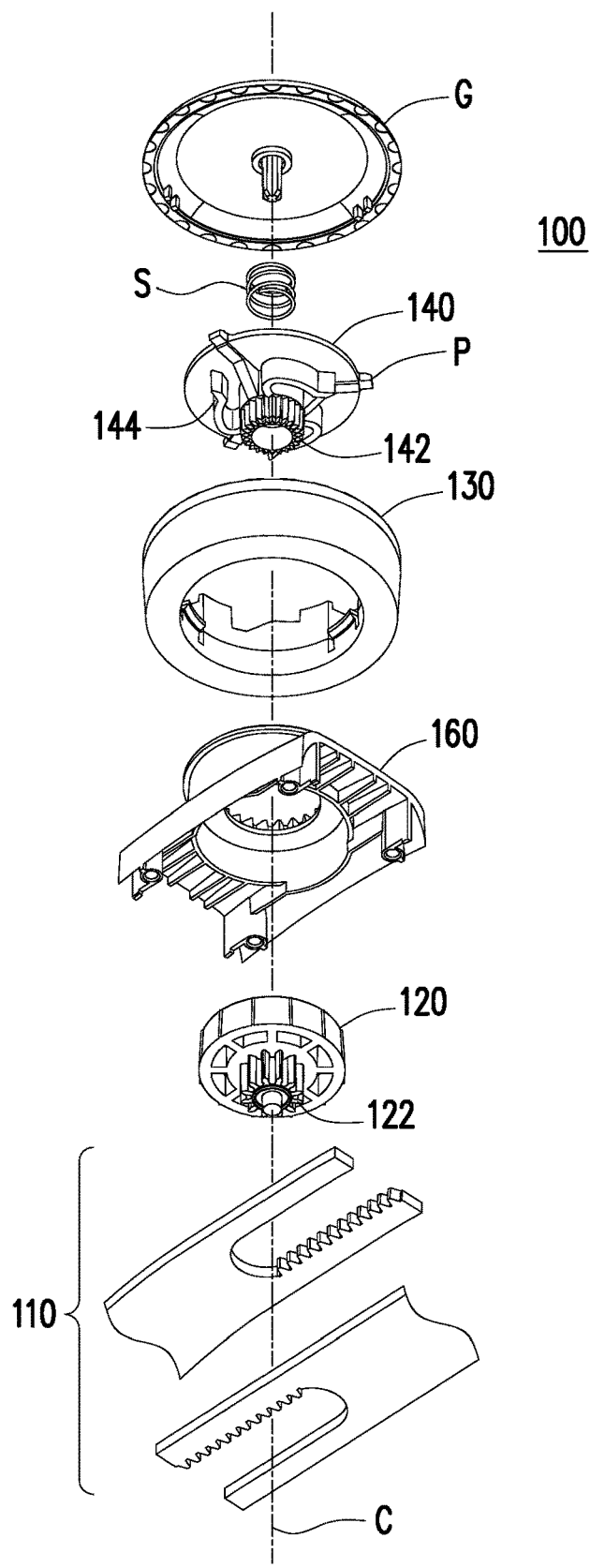
FIG. 1a is an exploded view of part of an adjusting mechanism according to an embodiment of the disclosure.
Figure 1B:
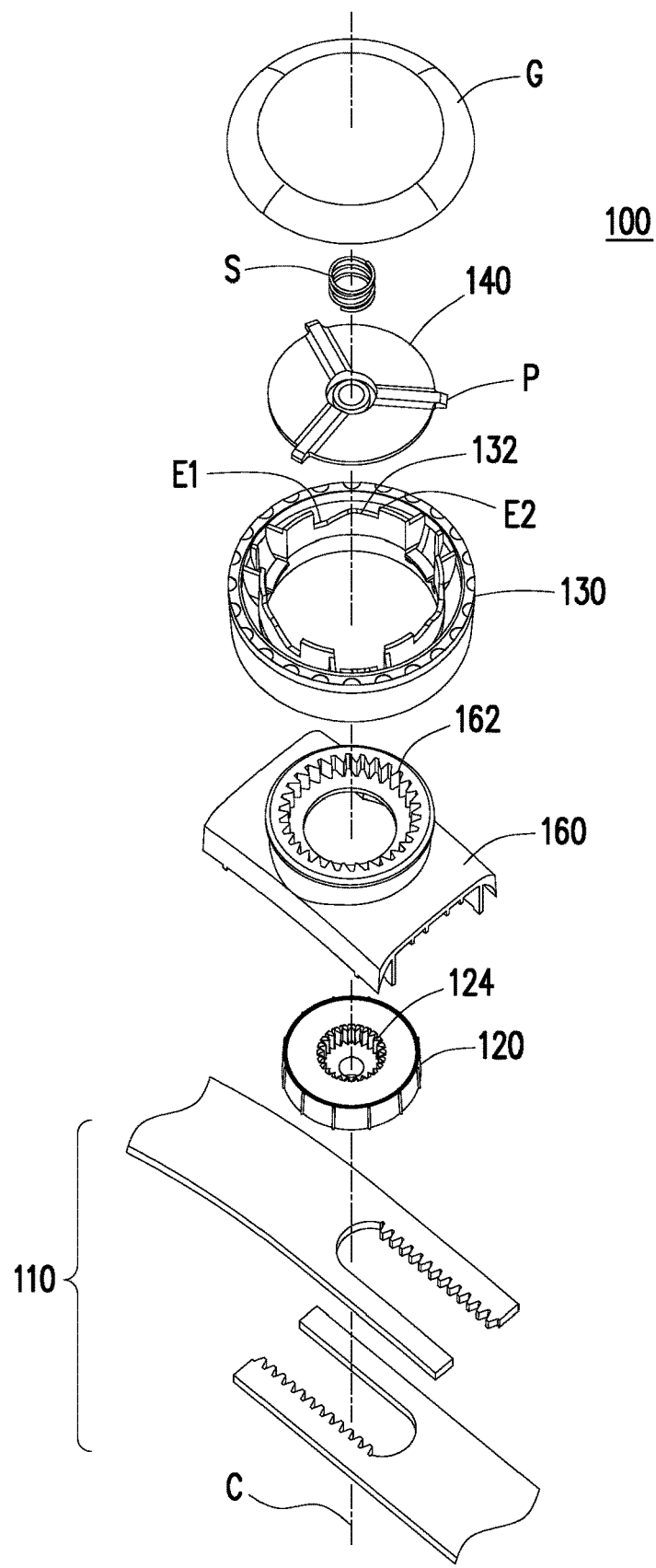
FIG. 1b is an exploded view of part of an adjusting mechanism from another perspective according to an embodiment of the disclosure.

FIG. 1a is an exploded view of an adjusting mechanism according to an embodiment of the disclosure. FIG. 1b is an exploded view of an adjusting mechanism from another perspective according to an embodiment of the disclosure. Referring to FIGS. 1a and 1b, in the embodiment of the disclosure, an adjusting mechanism 100 includes a band 110, a rotating shaft 120, a knob 130 and a driving member 140. The band 110, for example, may be flexible itself to bend according to the shape of an object against which the band 110 is pressed and to cling to the object in the process of adjusting the tightness of the band 110.

In the embodiment of the disclosure, the rotating shaft 120 has a first tooth ring 124 around a central axis C. When the rotating shaft 120 rotates around the central axis C, the band 110 is driven by the rotating shaft 120 to move relative to the rotating shaft 120. In the embodiment of the disclosure, the band 110 comes in the form of a rack to be coupled with a third tooth ring 122 of the rotating shaft 120, and may be in the forms of a rope, an elastic tape or other object. The disclosure is not limited thereto.

The knob 130 may rotate around the central axis C through a rotating force provided by a user. The knob 130 has a plurality of chutes 132. In the embodiment of the disclosure, each of the chutes 132 has a first section E1 and a second section E2, and the depth of each of the first sections E1 is larger than the depth of each of the second sections E2. In other words, a bottom of the first section E1 of the chute 132 is closer to the rotating shaft 120 than a bottom of the second section E2 of the chute 132. A stage exists between each of the first sections E1 and each of the second sections E2. The knob 130 is connected to the rotating shaft 120 coaxially to enable the knob 130 and the rotating shaft 120 to rotate around the same axis. In the embodiment of the disclosure, the axis refers to the central axis C.

The driving member 140 has a second tooth ring 142, a plurality of guiding pins P and a plurality of pawls 144. The driving member 140 is assembled to the knob 130, and each of the guiding pins P is disposed in each of the corresponding chutes 132. The numbers of the guiding pins P and the chutes 132 are not limited. For example, in the embodiment of the disclosure, the driving member 140 includes three guiding pins P, and the knob 130 includes three chutes 132. In another embodiment of the disclosure, the numbers of the guiding pins P and the chutes 132 may be any figures that are allowed by the circumference of the driving member 140 and the knob 130. The number of the guiding pins P is, for example, equal to the number of the chutes 132. The first tooth ring 124 is coupled with the second tooth ring 142, so the driving member 140 may drive the rotating shaft 120 to rotate. In the embodiment of the disclosure, the height of the stage difference between the first section E1 and the second section E2 of the chute 132 may enable the second tooth ring 142 to be coupled with or detached from the first tooth ring 124 completely. The tooth forms of the first tooth ring 124 and the second tooth ring 142 are generally triangular, but may be any form that allows the first tooth ring 124 and the second tooth ring 142 to be coupled with each other. The disclosure is not limited thereto. In the embodiment, the first tooth ring 124 is an external gear, while the second tooth ring 142 is an internal gear. In another embodiment, the first tooth ring 124 may be an internal gear, while the second tooth ring 142 may be an external gear. The disclosure is not limited thereto.

In the embodiment, the adjusting mechanism 100 further includes a top cover G that is assembled to the knob 130 and an elastic member S. The driving member 140 is limited to between the top cover G and the knob 130, and the elastic member S is located between the driving member 140 and the top cover G and is configured to apply elastic force toward the rotating shaft 120 to the driving member 140. Specifically speaking, the elastic member S provides fixed elastic force to the driving member 140 to allow each of the guiding pins P to be pressed closely against the bottom of each of the chutes 132 and to keep the guiding pin P within limits of the chute 132 to control the driving member 140 to be not moved upward and downward on the knob 130.

Figure 2:
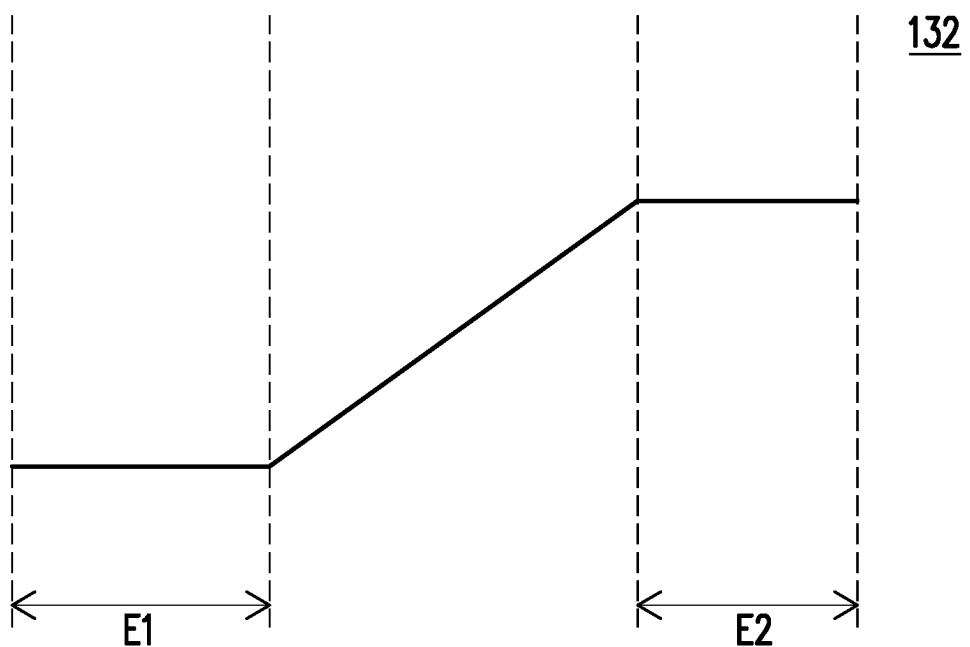
FIG. 2 is a schematic view of a chute of an adjusting mechanism according to an embodiment of the disclosure.
Figure 3A:
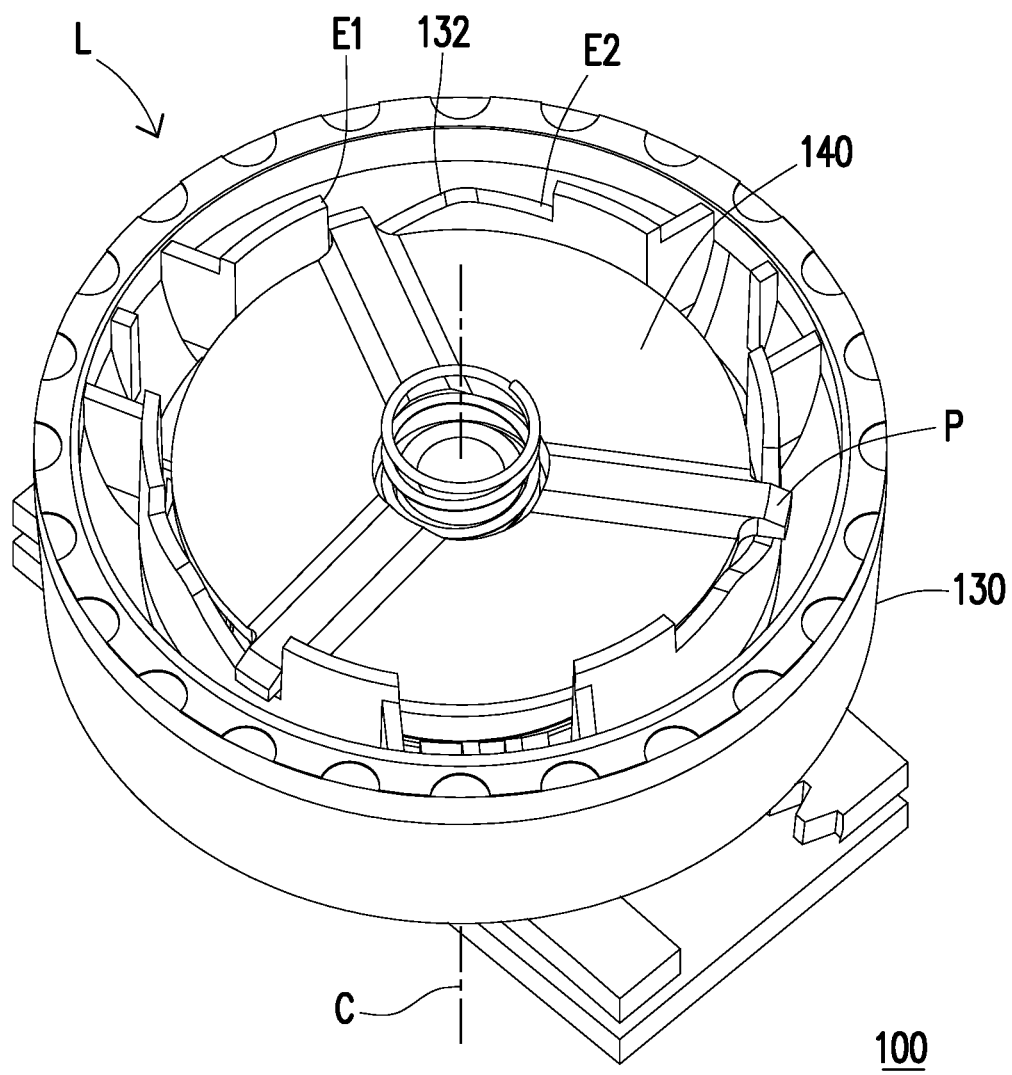
FIG. 3a is a schematic view illustrating a guiding pin of an adjusting mechanism being located in a first section according to an embodiment of the disclosure.
Figure 3B:
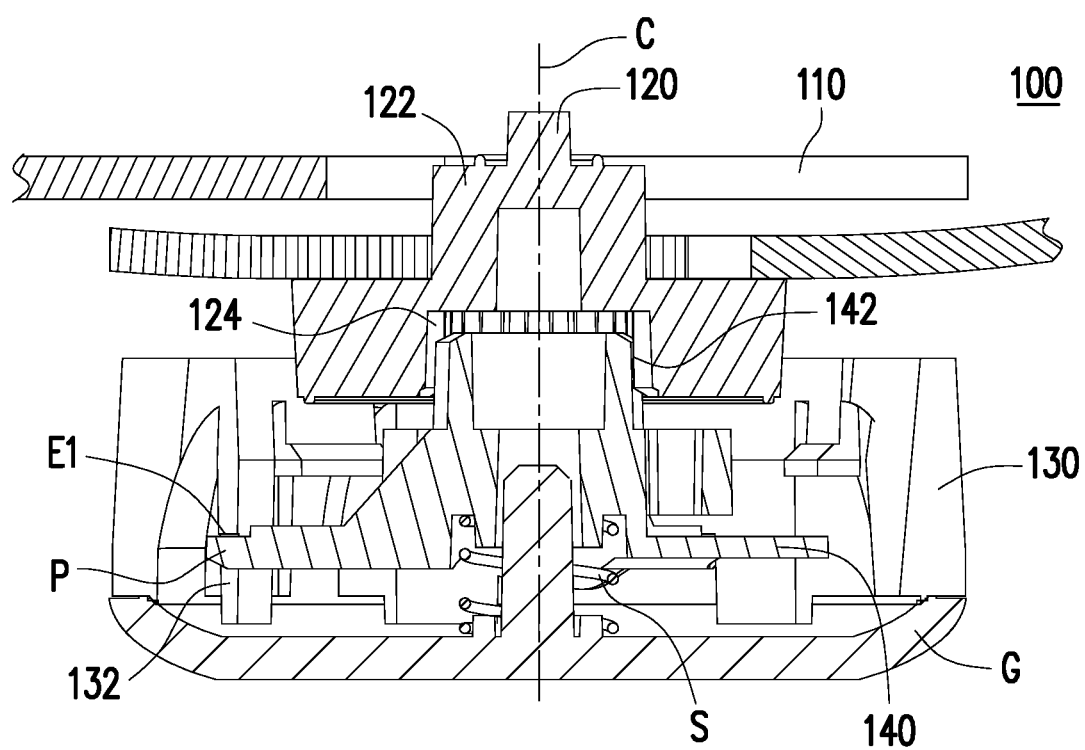

FIG. 2 is a schematic view of a chute of an adjusting mechanism according to an embodiment of the disclosure. FIG. 3a is a schematic view illustrating a guiding pin of an adjusting mechanism being located in the first section according to an embodiment of the disclosure. FIG. 3b is a cross-sectional view of the adjusting mechanism of FIG. 3a.

Referring to FIG. 2, when the knob 130, for example, is turned in a clockwise direction as in FIG. 1b and drives the driving member 140 to be turned in the clockwise as in FIG. 1b. The guiding pins P may move between the first sections E1 and the second sections E2. Referring to FIGS. 3a and 3b, the second tooth ring 142 engages with the first tooth ring 124 when the guiding pins P are located in the first sections E1. At the moment, the driving member 140 is coupled with the rotating shaft 120, and a rotating force provided by the user is transmitted to the rotating shaft 120 through the knob 130 and the driving member 140. The rotating shaft 120 drives the band 110 by the rotating force to move relative to the rotating shaft 120. The user may adjust the tightness of the adjusting mechanism 100 through the relative movement of the band 110.

Figure 4A:
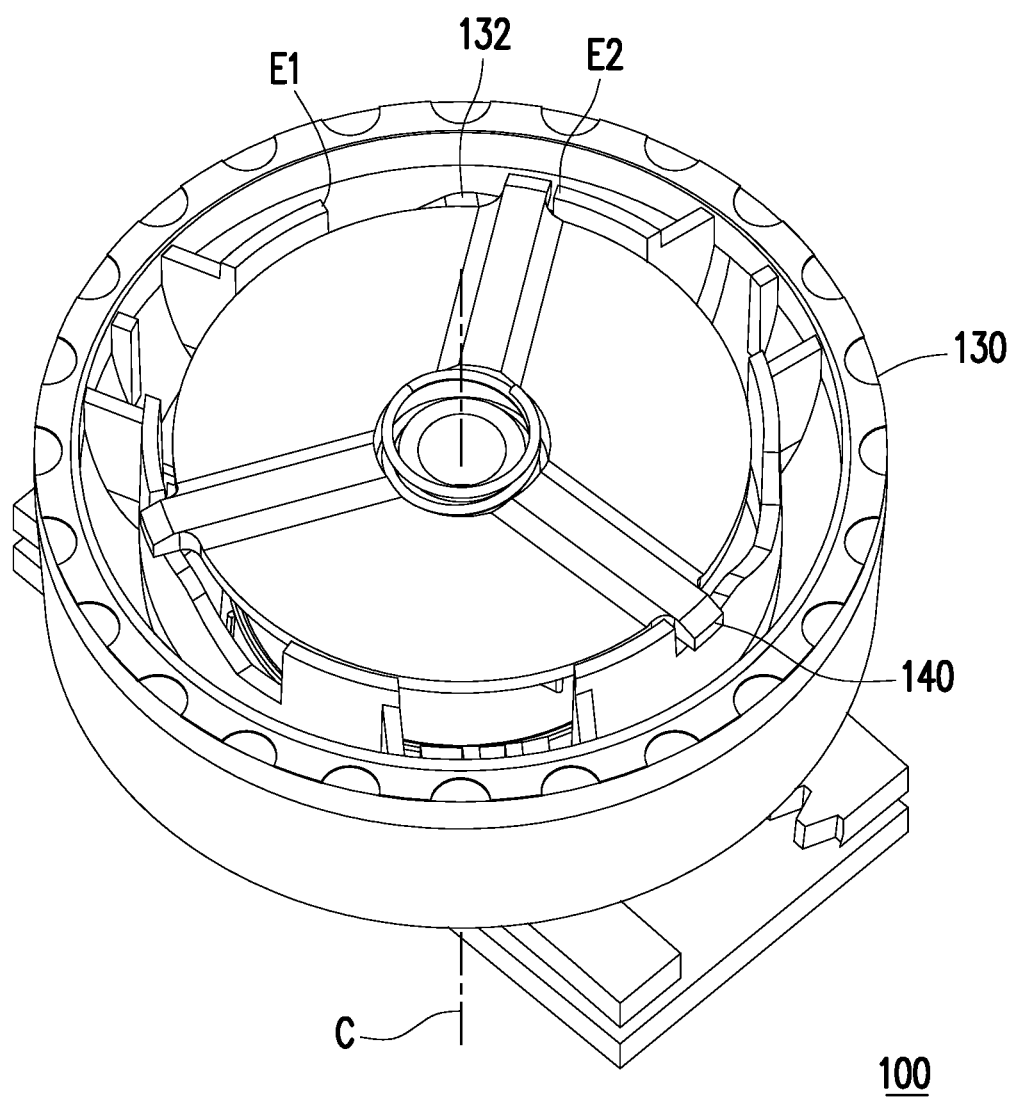
FIG. 4a is a schematic view illustrating a guiding pin of an adjusting mechanism being located in a second section according to an embodiment of the disclosure.
Figure 4B:
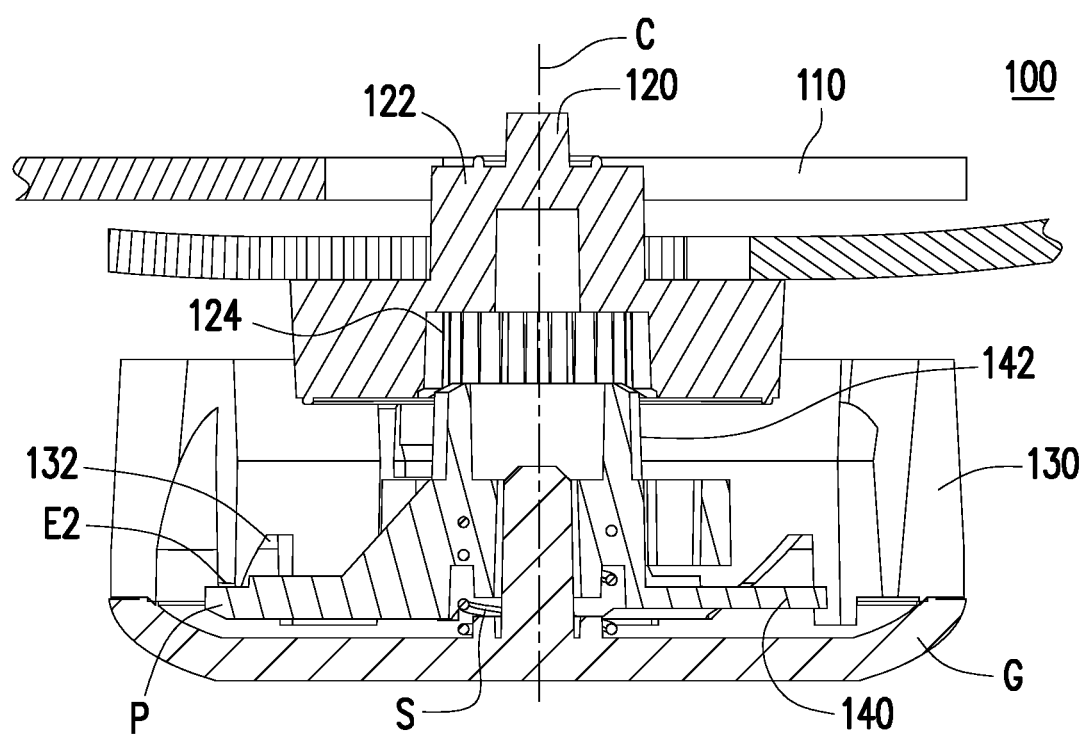

FIG. 4a is a schematic view illustrating a guiding pin of an adjusting mechanism being located in the second section according to an embodiment of the disclosure. FIG. 4b is a cross-sectional view of the adjusting mechanism of FIG. 4a. Referring to FIGS. 4a and 4b, the second tooth ring 142 is detached from the first tooth ring 124 when the guiding pins P are located in the second sections E2. At the moment, the rotating shaft 120 is off the limits of the driving member 140 and may be turned freely. The band 110, when receiving tension, may move relative to the rotating shaft 120 without being limited. In other words, the user, for example, turns the knob 130 in s counterclockwise direction as in FIG. 1b to allow the driving member 140 to rotate relative to the knob 130 in the clockwise direction as in FIG. 1b. The guiding pins P move from the first sections E1 to the second sections E2. At the moment, the rotating shaft 120 is off the limits of the driving member 140 to make the band loose quickly without resistance when receiving tension.

Figure 5:
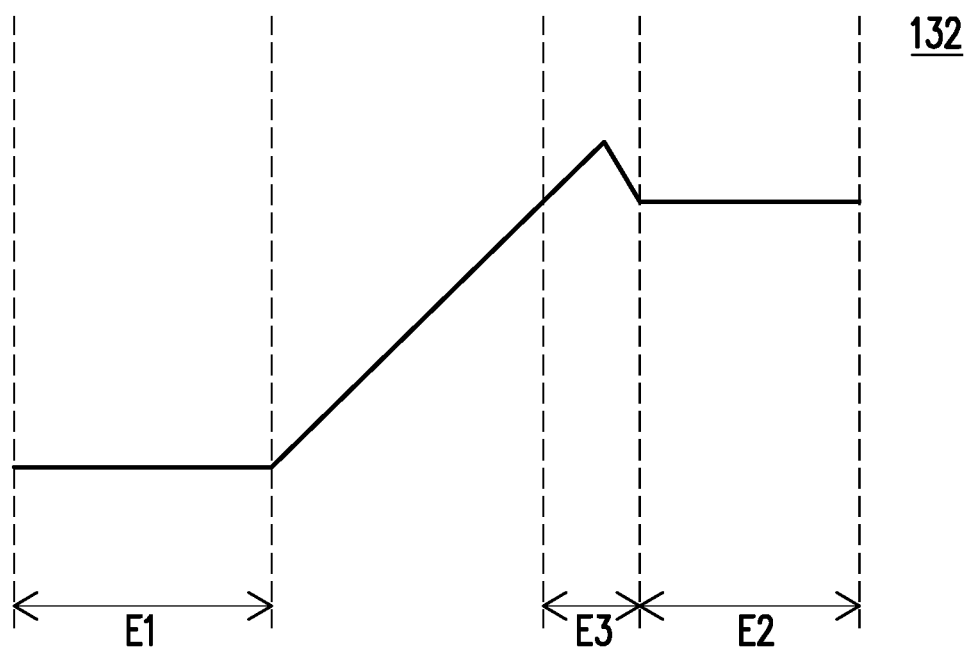
FIG. 5 is a schematic view of a chute of an adjusting mechanism according to another embodiment of the disclosure.

FIG. 5 is a schematic view of a chute of an adjusting mechanism according to another embodiment of the disclosure. Referring to FIG. 5, in another embodiment, in addition to the first section E1 and the second section E2, each of the chutes 132 further has a third section E3. The third sections E3 are located between the first sections E1 and the second sections E2. The depth of each of the second sections E2 is larger than the depth of each of the third sections E3. In other words, a bottom of the second section E2 of the chute 132 is closer to the rotating shaft 120 than a bottom of the third section E3 of the chute 132. Due to the presence of the third section E3, protrusions are found between each of the first sections E1 and each of the second sections E2 in each of the chutes 132. When the guiding pin P moves between the first section E1 and the second section E2, the user feels the fluctuation of the guiding pin P through the protrusions in the third section E3 and becomes aware that the mode of the driving member 140 is indeed switched between the first section E1 and the second section E2. The protrusions in the third section E3 may further prevent the guiding pin P from moving freely between the first section E1 and the second section E2 due to the sway of the driving member 140 or slight forces.

Figure 6:
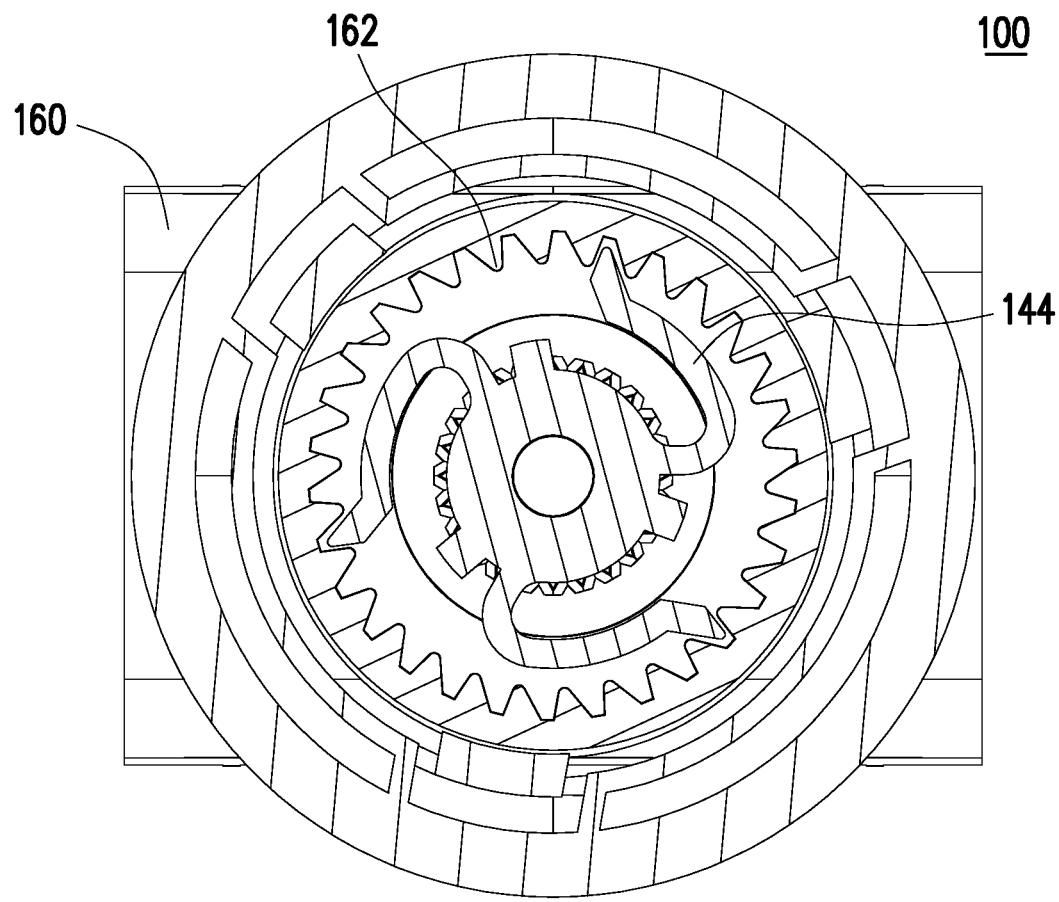
FIG. 6 is a schematic view illustrating a pawl of an adjusting mechanism being coupled with a circular unidirectional toothed portion according to an embodiment of the disclosure.

FIG. 6 is a schematic view illustrating a pawl of an adjusting mechanism being coupled with a circular unidirectional toothed portion according to an embodiment of the disclosure. Referring to FIG. 6, a holder 160 has a circular unidirectional toothed portion 162. The band 110 limits the holder 160 to rotate relative to the band 110. In other words, when the band 110 moves relative to the rotating shaft 120, the band 110 only moves relative to the holder 160 instead of rotating relative to the holder 160. The circular unidirectional toothed portion 162 are configured to be coupled with the pawls 144 to limit the driving member 140 to rotate relative to the holder 160 only in a single direction. When the driving member 140 rotates relative to the holder 160 in a single direction, for example, when the driving member 140 rotates in the counterclockwise direction as in FIG. 1b, the guiding pin P moves toward the first section E1.

When the guiding pins P are located in the first sections E1, the driving member 140 and the holder 160 are in a locked state L. At the moment, the driving member 140 is still able to drive the guiding pin P to rotate in a direction toward the first section E1 to enable the user to turn the knob 130 continuously to adjust the tightness of the band 110. Referring to FIGS. 3a and 3b, when the knob 130 is turned to move the guiding pins P toward the second sections E2, the circular unidirectional toothed portion 162 is coupled with the pawl 144, and the driving member 140 is prevented from rotating in a direction to drive the guiding pins P to move toward the second section E2. While the driving member 140 remains in a fixed position by turning the knob 130, the chutes 132 drive the driving member 140 away from the knob 130 to release the locked state L. When the driving member 140 is out of the locked state, the user may quickly loosen the adjusting mechanism 100 simply by pulling the adjusting mechanism 100.

Other embodiments are presented for explanation purposes. It is noted that reference numerals and some contents from the previous embodiments are quoted in the embodiments below. The same reference numeral denotes the same or similar element, and explanations about the same techniques are omitted. The previous embodiments provide references to what is omitted, and similar descriptions are not repeated in the following embodiments.

Figure 7:
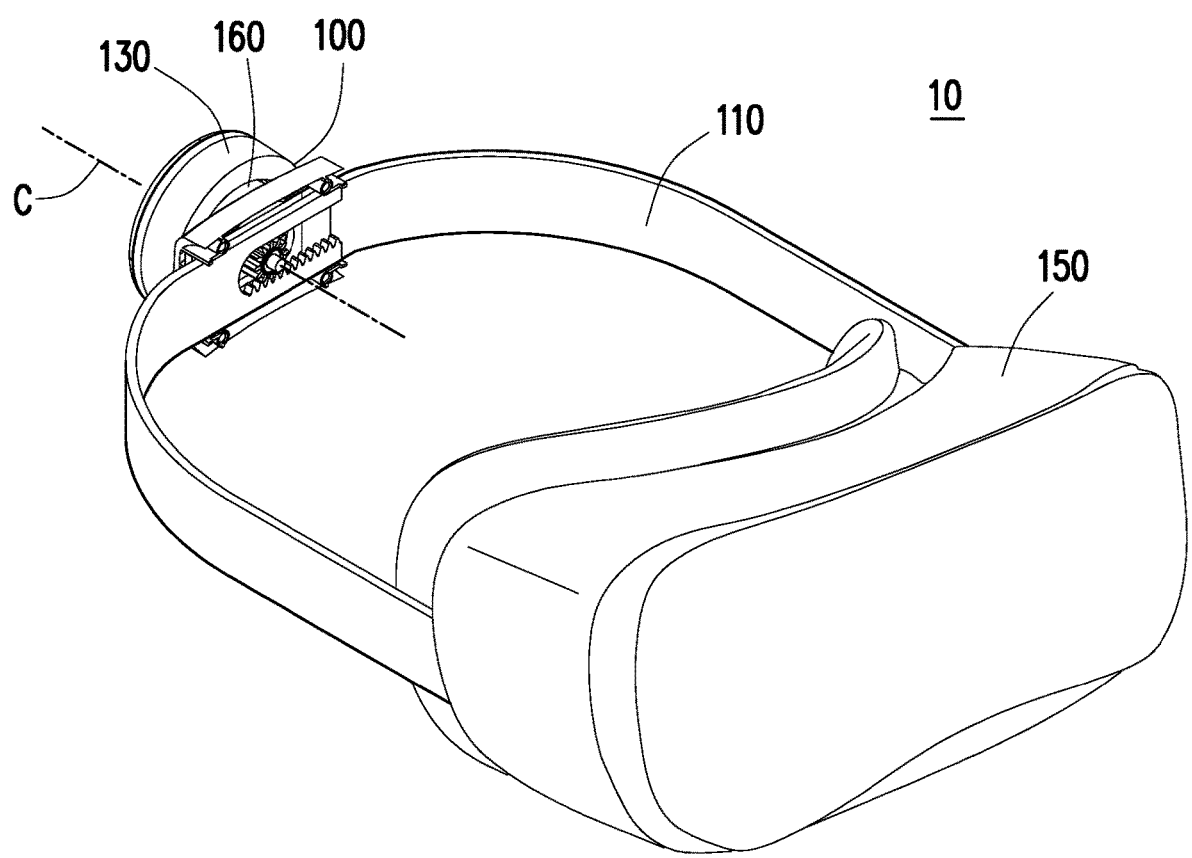
FIG. 7 is a schematic view of a head mounted display according to an embodiment of the disclosure.

FIG. 7 is a schematic view of a head mounted display according to an embodiment of the disclosure. Referring to FIG. 7, the disclosure provides a head mounted display for the adjusting mechanism. A head mounted display 10 includes a display portion 150 and the adjusting mechanism 100. The adjusting mechanism 100 is, for example, pivotally connected to the display portion 150. The user adjusts the tightness of the band 110 by turning the knob 130 to drive the band 110 to rotate relative to the rotating shaft 120. When the user wears the head mounted display 10, the length of the band 110 may be shortened by the user adjusting the knob 130 and may not be shortened until the band 110 is pressed again the user's head. The display portion 150 is directed at the user's eyes to provide the user with images. A liquid crystal display (LCD), for example, is disposed inside the display portion 150. The display portion 150 according to the embodiment may serve as a virtual reality device, but the disclosure is not limited thereto. It is worth mentioning that the adjusting mechanism according to the above embodiment may be used in devices such as shoes or a helmet to easily adjust the tightness of laces or headbands.

In view of the foregoing, among the embodiments of the disclosure, the user turns the knob to drive the band through the driving member and the rotating shaft to move the band relative to the rotating shaft until the band is smoothly and closed pressed again the user's head. In addition, as long as the user turns the knob counterclockwise, the adjusting mechanism is out of the locked state. Therefore, the band may be loosened to expand the size wrapped by the band. At the moment, the user may take off the head mounted display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adjusting mechanism, comprising:
    a band;
    a rotating shaft, having a first tooth ring around a central axis, wherein the band is driven by the rotating shaft to move relative to the rotating shaft when the rotating shaft rotates around the central axis;
    a knob, having a plurality of chutes, wherein each of the chutes has a first section and a second section, and the depth of each of the first sections is larger than the depth of each of the second sections;
    a driving member, having a second tooth ring, a plurality of guiding pins and a plurality of pawls, wherein the driving member is assembled to the knob, the guiding pins are located in the chutes, the second tooth ring engages with the first ring tooth when the guiding pins are located in the first sections, and the second tooth ring is detached from the first tooth ring when the guiding pins are located in the second sections; and
    a holder, having a circular unidirectional toothed portion, wherein the band limits the rotation of the holder relative to the band, and the circular unidirectional toothed portion is configured to be coupled with the pawls to limit the rotation of the driving member relative to the holder in a single direction.

2. The adjusting mechanism according to claim 1, further comprising:
    a top cover, assembled to the knob, wherein the driving member is limited to be between the top cover and the knob; and
    an elastic member, located between the driving member and the top cover and configured to apply elastic force toward the rotating shaft to the driving member.

3. The adjusting mechanism according to claim 1, wherein the band is a rack.

4. The adjusting mechanism according to claim 1, wherein the driving member and the holder are in a locked state when the guiding pins are located in the first sections; and the chutes drive the driving member away from the holder to release the locked state when the knob is turned to move the guiding pins toward the second sections.

5. The adjusting mechanism according to claim 1, wherein the knob is connected to the shaft coaxially.

6. The adjusting mechanism according to claim 1, wherein each of the chutes further has a third section that is located between the first section and the second section, and the depth of each of the second sections is larger than the depth of each of the third sections.

7. A head mounted display, comprising:
    a display portion;
    an adjusting mechanism, including:
        a band, connected to the display portion;
        a rotating shaft, having a first tooth ring around a central axis, wherein the band is driven by the rotating shaft to move relative to the rotating shaft when the rotating shaft rotates around the central axis;
        a knob, having a plurality of chutes, wherein each of the chutes has a first section and a second section, and the depth of each of the first sections is larger than the depth of each of the second sections;
        a driving member, having a second tooth ring, a plurality of guiding pins and a plurality of pawls, wherein the driving member is assembled to the knob, the guiding pins are located in the chutes, the second tooth ring engages with the first tooth ring when the guiding pins are located in the first sections, and the second tooth ring is detached from the first tooth ring when the guiding pins are located in the second sections; and a holder, having a circular unidirectional toothed portion, wherein the band limits the rotation of the holder relative to the band, and the circular unidirectional toothed portion is configured to be coupled with the pawls to limit the rotation of the driving member relative to the holder in a single direction.

8. The head mounted display according to claim 7, wherein the adjusting mechanism further comprises:

a top cover, assembled to the knob, wherein the driving member is limited to be between the top cover and the knob; and an elastic member, located between the driving member and the top cover and configured to apply elastic force toward the rotating shaft to the driving member.

9. The head mounted display according to claim 7, wherein the band is a rack.

10. The head mounted display according to claim 7, wherein the driving member and the holder are in a locked state when the guiding pins are located in the first sections, and the chutes drives the driving member away from the holder to release the locked state when the knob is turned to move the guiding pins toward the second sections.

11. The head mounted display according to claim 7, wherein the knob is connected to the rotating shaft coaxially.

12. The head mounted display according to claim 7, wherein each of the chutes further has a third section that is located between the first section and the second section, and the depth of each of the second sections is larger than the depth of each of the third sections.

* * * * *